United States Patent [19]

Bingham et al.

[11] 4,422,175

[45] Dec. 20, 1983

[54] CONSTRAINED ADAPTIVE EQUALIZER

[75] Inventors: John A. C. Bingham, Palo Alto; Jack H. Kurzweil, San Jose, both of Calif.

[73] Assignee: Racal-Vadic, Inc., Sunnyvale, Calif.

[21] Appl. No.: 272,776

[22] Filed: Jun. 11, 1981

[51] Int. Cl.³ ............................................. H04B 3/04
[52] U.S. Cl. ...................................... 375/14; 333/18; 364/724
[58] Field of Search ............................... 375/11-15, 375/34, 39, 42; 333/18, 28 R; 364/724; 328/155, 162; 179/170.2

[56] References Cited

U.S. PATENT DOCUMENTS

| | | | |
|---|---|---|---|
| 3,368,168 | 2/1968 | Lucky | 333/18 |
| 3,414,819 | 12/1968 | Lucky | 375/16 |
| 3,524,169 | 8/1970 | McAuliffe et al. | 364/900 |
| 3,573,624 | 4/1971 | Hartmann et al. | 375/12 |
| 3,638,122 | 1/1972 | Gibson | 375/12 |
| 3,731,199 | 5/1973 | Tazaki et al. | 375/34 |
| 3,906,347 | 9/1975 | Motley et al. | 375/39 |
| 4,025,719 | 5/1977 | Nussbaumer | 375/15 |
| 4,330,861 | 5/1982 | Impallomeni et al. | 333/18 |
| 4,334,313 | 6/1982 | Gitlin et al. | 375/13 |

OTHER PUBLICATIONS

D. L. Lyon, "Timing Recovery in Synchronous Equalized Data Communications", *IEEE Transactions on Communication*, Feb. 1975, pp. 269-274.
Qureshi and Forney, Jr., "Performance and Properties of a T/2 Equalizer", NTC, 1977, 11:1.
Salazar, "Design of Transmitter and Receiver Filters for Decision Feedback Equalization", *BSTJ*, vol. 53, No. 3, Mar. 1974, pp. 503-523.
Rudin, Jr., "Automatic Equalization Using Transversal Filters", IEEE Spectrum, Jan. 1967, pp. 53-59.
Falconer (1), "Application of Passband Decision Feedback Equalization in Two-Dimensional Data Communication Systems", *IEEE Transactions on Communications*, Oct. 1976, pp. 1159-1166.
Falconer (2), "Jointly Adaptive Equalization and Carrier Recovery in Two-Dimensional Digital Communication Systems", *The Bell System Technical Journal*, vol. 55, No. 3, Mar. 1976.
Falconer (3), "Analysis of a Gradient Algorithm for Simultaneous Passband Equalization and Carrier Phase Recovery", *The Bell System Technical Journal*, vol. 55, No. 4, Apr. 1976.
George et al., "An Adaptive Decision Feedback Equalizer", *IEEE Transactions on Communication*, vol. 19, No. 3, Jun. 1971, pp. 281-293.
Belfiore et al., "Decision Feedback Equalization", *Proceedings of the IEEE*, vol. 67, No. 8, Aug. 1979, pp. 1143-1156.
Gitlin et al., "Passband Equalization of Differentially Phase Modulated Data Signals", *The Bell System Technical Journal*, vol. 52, No. 2, Feb. 1973, pp. 219-238.
Ungerboeck, "Fractional Tap-Spacing Equalizer and Consequences for Clock Recovery and Data Modems", *IEEE Transactions on Communication*, vol. Com-24, No. 8, Aug. 1976, pp. 856-864.

*Primary Examiner*—Benedict V. Safourek
*Assistant Examiner*—Stephen Chin
*Attorney, Agent, or Firm*—Arnold, White & Durkee

[57] ABSTRACT

Disclosed is a constrained adaptive equalizer for use in a digital communication system receiver combining transversal and decision feedback equalization techniques. The constrained adaptive equalizer uses a constraint on the taps of the tranversal section of the equalizer which has both leading and lagging taps. These constraints force the transversal equalizer to correct only the leading echoes of a received digital signal in a communication system and treat them as if they resulted only from phase distortion. The constrained adaptive equalizer minimizes noise amplification while reducing intersymbol interference. The transversal segment of the constrained adaptive equalizer approximate the phase equalizer by constraining its multiplying coefficients i.e. taps, in accordance with the symmetry of the differential delay characteristic of the transmission medium around a signal carrier frequency. This constrained transversal decision feedback equalizer combination can be used for either passband or baseband equalization and for either complex signals, such as QAM signals, or real signals, such as baseband or single side band signal.

33 Claims, 8 Drawing Figures

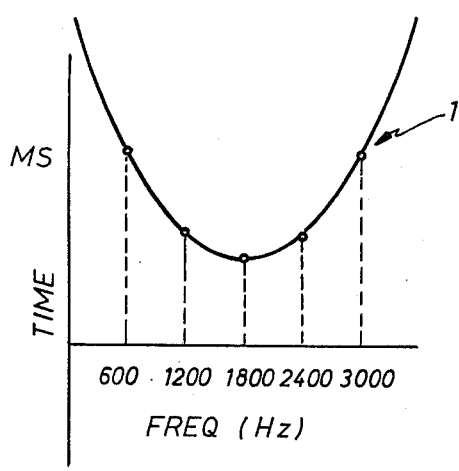
Fig. 1
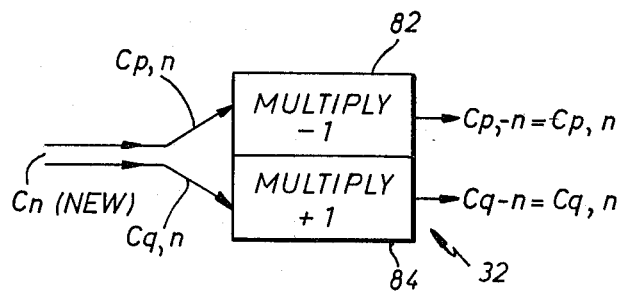
Fig. 4b SYMMETRIC
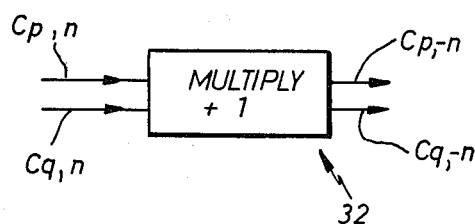
Fig. 4c ANTISYMMETRIC
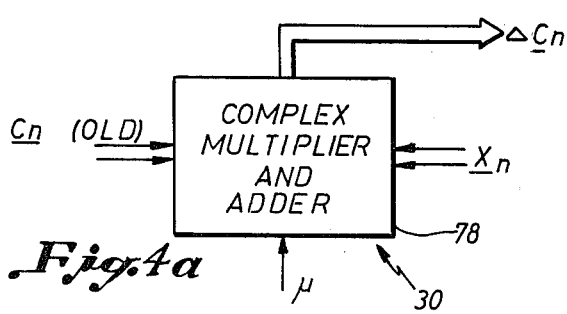
Fig. 4a
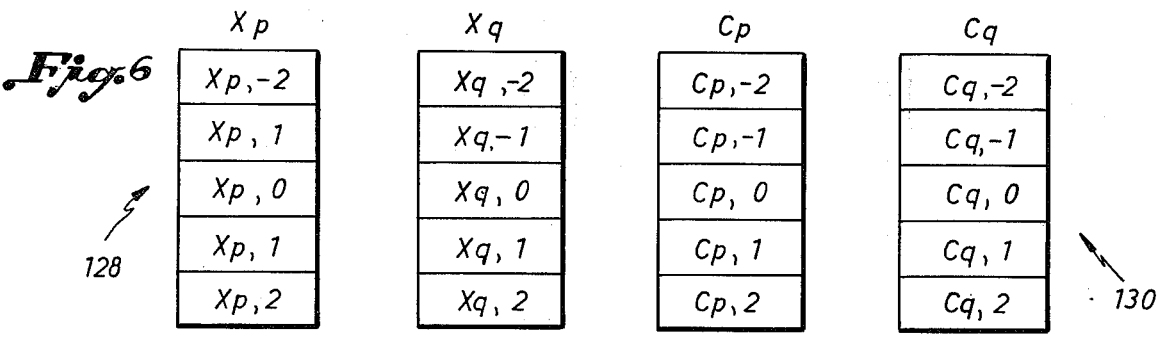
Fig. 6
TRANSVERSAL
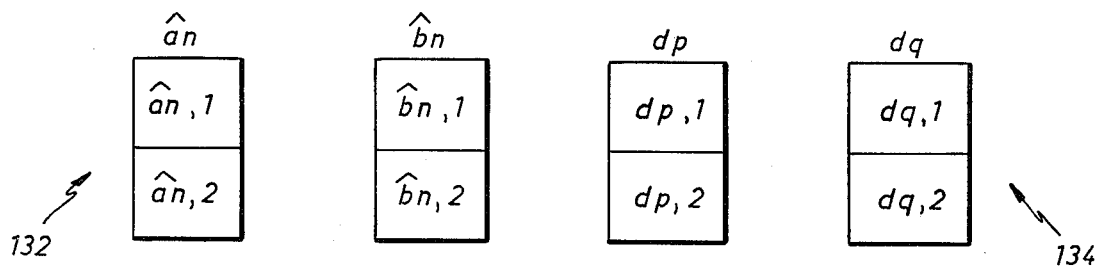
DECISION FEEDBACK

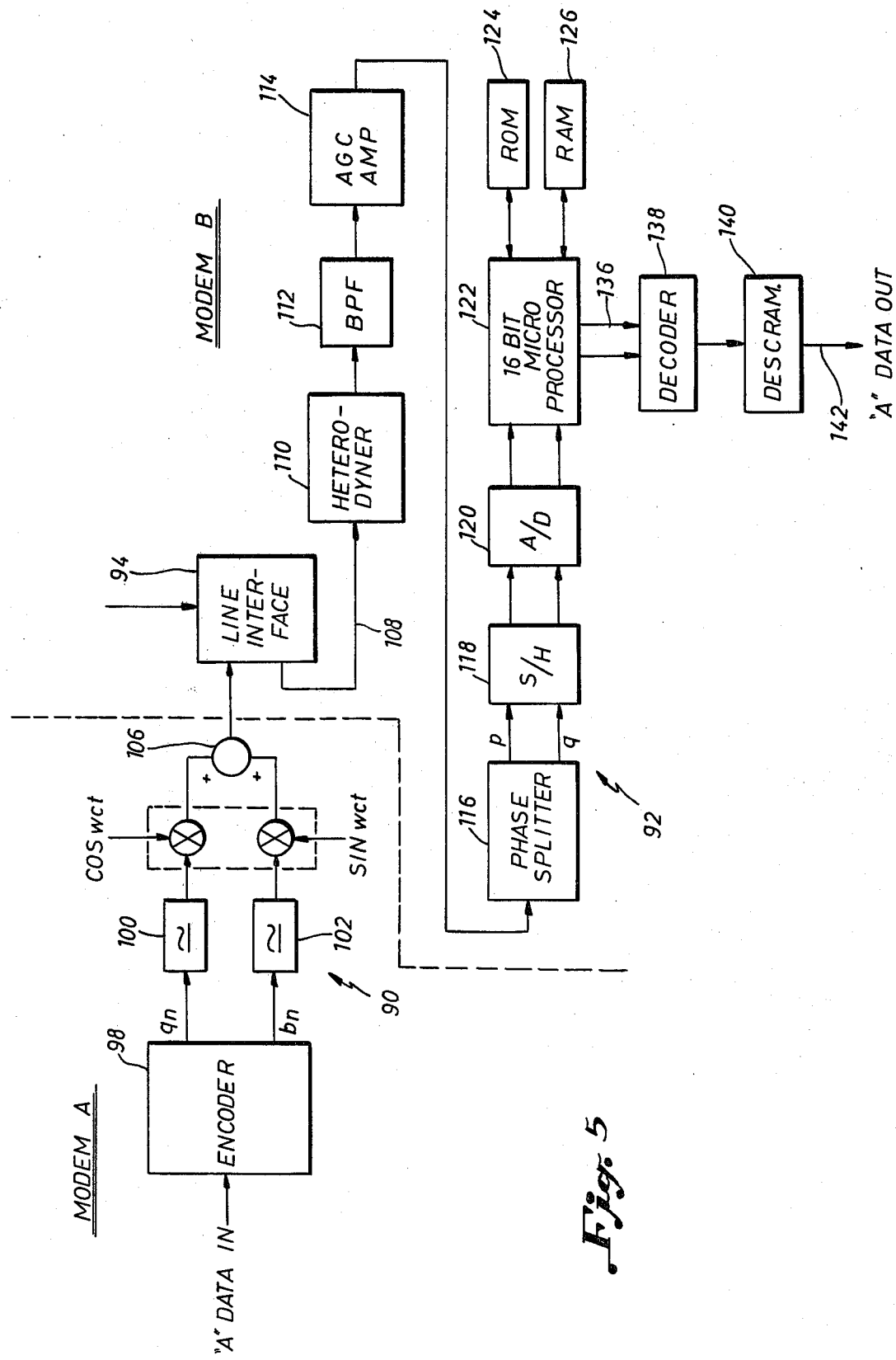

CONSTRAINED ADAPTIVE EQUALIZER

BACKGROUND OF THE INVENTION

This invention relates generally to adaptive equalizers for baseband and carrier modulation systems such as single sideband and quadrature amplitude modulation communication systems, and more particularly to a constrained adaptive equalizer for use in eliminating amplitude and delay distortion in a digital signal.

In digital data transmission systems, the presence of amplitude and delay distortion in the transmission medium gives rise to intersymbol interference (ISI). Intersymbol interference and noise result in errors in determining the value of the transmitted signal at the receiver. The effect of intersymbol interference is to increase the likelihood that any noise in the system will lead to such error.

Adaptive equalizers have been used to reduce intersymbol interference. All methods and devices for adaptively equalizing the digital signal proposed thus far produce some noise amplification. It is noted that these problems of noise and distortion exist in both baseband and passband communication systems. Further, it is noted that adaptive equalization has been used to suppress distortion in both types of systems.

In the development of equalization techniques, initially the structures proposed for both baseband and passband were pure transversal equalizers. These equalizers adequately suppress ISI but may excessively amplify system noise. These transversal equalizers have leading and lagging taps (multiplying coefficients) for operation or precursors (leading echoes) and postcursors (trailing echoes) of the received signal, respectively.

In order to reduce this additional noise penalty, it has been proposed, both in the baseband and passband, to equalize only the precursors with a transversal equalizer and the postcursors with a decision feedback equalizer. This structure necessitates only half the number of stages of the transversal equalizer, i.e., a "one-sided" transversal equalizer, thereby reducing the noise penalty. Since the decision feedback equalizer only subtracts from its input signal a set of distortion components, and since these distortion components are derived from decided data signals and are therefore noise-free, there is no further noise amplification. Nevertheless, the amount of noise attributable to the one-sided transversal equalizer will still, under certain transmission conditions, be excessive.

Another approach to reducing noise amplification was proposed by Lyon in an article entitled "Timing Recovery and Synchronous Equalized Data Communication", *IEEE Transactions on Communication*, February, 1975, pp. 269-274. Lyon recognized that nulls in the spectrum of the sampled received signal could be created by the process of sampling. The attempt to equalize such nulls leads to severe amplification of noise. Lyon suggests sampling at a time epoch chosen to minimize nulls and thus minimize the noise amplification. This proposed system was very complex to implement, especially the timing recovery circuit. It required that a special training sequence be known at the receiver to guarantee equalizer convergence. This pure transversal system with special timing still resulted in excessive noise.

Qureshi and Forney, in an article entitled "Performance and Properties of a T/2 Equalizer", NTC, 1977, 11:1, proposed a fractional tap spacing transversal equalizer. This equalizer avoids generating nulls in the sampled spectrum by sampling at twice the baud rate. One disadvantage of this approach is that digital signal processing must take place at a higher speed than that required by the baud rate sampling. Thus, long equalizers are required, and the noise penalty for amplitude distortion on the channel is still exacted.

The systems utilizing one-sided transversal equalizers recognize the presence of nulls in the sampled spectrum. By incorporating the decision feedback equalizer for the postcursor correction the effect of noise amplification from equalization of all of the nulls in the sample spectrum is reduced.

SUMMARY OF THE INVENTION

The adaptive equalizer of the present invention provides a means for equalization that contributes significantly less noise than the prior systems while continuing to minimize the intersymbol interference. This adaptive equalizer corrects for leading and trailing echoes by using a transversal equalizer in combination with a decision feedback equalizer, wherein the transversal equalizer approximates a phase equalizer by constraining its multiplying coefficients, i.e., taps, in accordance with the symmetry of the differential delay characteristic of the transmission medium around a signal carrier frequency.

The equalizer of the present invention may be utilized either in a baseband type system or a carrier type system based on quadrature amplitude modulation (QAM). In such systems serial binary data is transformed to a complex data signal for transmission to a remote location via a transmission medium. A receiver is provided at the remote location for receiving the transmitted signal. One of the components of this receiver is the constrained adaptive equalizer of the present invention.

The present constrained adaptive equalizer is provided with a constrained transversal adaptive equalizer in combination with a decision feedback equalizer and means for determining the value of the transmitted signal. The constrained transversal adaptive equalizer is provided with leading and trailing multiplying coefficients for correcting the leading echoes in a received digital signal, thereby generating a phase equalized signal. These trailing coefficients are constrained so that the adaptive transversal equalizer approximates, as closely as possible, a phase equalizer. In a baseband type system the equalizer taps and the sampled data going into the equalizer are one dimensional (real numbers). In a QAM type system both the sampled data and the taps are two dimensional (complex numbers). The real and imaginary parts of these numbers are, respectively, the in-phase and quadrature components.

For baseband type systems the "carrier frequency" is zero. Therefore, the phase characteristic of the received signal is always antisymmetric; and the required constraint on the taps is that they be antisymmetric as well.

In carrier-type systems, where the system phase characteristic around the carrier frequency is arbitrary, the required constraints are more complex. Where the transmission medium has a differential delay characteristic which is substantially even around the carrier frequency used in the modulation of the transmitted data, the trailing multiplying coefficients of the transversal equalizer are negatively symmetric in the in-phase component and positively symmetric in the quadrature component of the multiplying coeffecents to the corresponding in-phase and quadrature components of the leading multiplying coefficients. Alternatively, where the transmission medium has a differential delay characteristic which is substantially odd around the carrier frequency of the transmitted data, the trailing multiplying coefficients of the transversal equalizer are positively symmetric in both the in-phase and quadrature components of the trailing multiplying coefficients to the in-phase and quadrature components of the leading multiplying coefficients.

The constrained adaptive equalizer further includes a decision feedback equalizer having trailing multiplying coefficients for simulating trailing echoes in the phase equalized signal. Thus the decision feedback effectively corrects for amplitude distortion.

A decision means for determining the value of the received data signal is provided utilizing the phase equalized signal from the transversal adaptive equalizer and an equalized signal representative of the difference between the phase equalized signal and the simulated echoes, to decide on the value of the received signal when compared to a predetermined threshold value. The decision means further includes a means for generating an error signal representing the amplitude difference between the equalized data signal and the decided value signal. The decision means also includes a means for correcting the phase difference between the equalized signal and the decided value output data signal.

The constrained adaptive equalizer also includes means for adaptively updating the leading multiplying coefficients of the constrained transversal adaptive equalizer and the trailing multiplying coefficients of the decision feedback equalizer. This adaptive updating for the leading multiplying coefficients of the constrained transversal adaptive equalizer is accomplished by cross-correlation of the present error signal generated by the decision means with the past and present received data signals associated with each of said leading multiplying coefficients. Adaptive updating of the trailing multiplying coefficients of the decision feedback equalizer is accomplished by cross-correlating the error signal with the decided output data signal. A means is also provided for controlled updating of the trailing multiplying coefficients of the constrained transversal adaptive equalizer. The controlled updating is dependent upon the symmetry of the differential delay characteristics of the transmission medium around a space selected carrier frequency.

The means for correcting for phase difference between the equalized signal and the decided value signal in the constrained adaptive equalizer of the previously described embodiment includes a means for determining the angular error between the equalized signal and the output data signal. This angular error is transmitted to a phase locked loop for generating an angle of rotation which is then transmitted to a means for rotating the phase equalized signal.

The constrained adaptive transversal equalizer in a first embodiment comprises a delay line shift register having a plurality of stages each of which can accommodate a digital word having a known length. The transversal equalizer also includes a series of storage elements containing the leading and trailing multiplying coefficients. Each of these storage elements is electrically connected to a different individual stage of the shift register. A series of multipliers are provided, electrically associated with each of the storage elements and their respective shift register stages, for multiplying the contents of each shift register stage by the corresponding multiplying constant. Finally, the summing element is provided to store the accumulated product of each of the stages of the shift register and their corresponding multiplying coefficients.

The decision feedback equalizer in the first embodiment comprises a delay-line shift register, similar to the delay-line shift register in the constrained adaptive transversal equalizer, having a plurality of stages with each stage accommodating a digital word having a known length. The decision feedback equalizer also includes a plurality of storage elements associated with a different individual stage of the shift register for storing trailing multiplying coefficients. A series of multipliers are electrically associated with each of the stages of the delay-line shift register of the decision feedback equalizer and their corresponding storage element for multiplying the constants stored in the storage elements by the values stored in each of the respective stages in the shift register. A summing element is provided to accumulate the products of these multiplications.

In an alternate embodiment of the present invention relating to a constrained adaptive equalizer for digital communication systems, a microprocessor based digital signal processor is utilized in combination with digital memories. The digital memories used in this combination include a random access memory and a read only memory. The random access memory implements the functional elements of the adaptive equalizer while the read only memory contains an instruction set whose execution approximates phase equalization of an incoming digital signal.

The random access digital memory has a plurality of storage locations with a predefined number of those locations implementing a first digital delay line. A corresponding number of these locations store leading and trailing multiplying coefficients for correction of delay distortion. A predefined number of locations implement a second digital delay line with a corresponding number of locations storing trailing coefficients for correction for amplitude distortion. It is noted that both the in-phase and quadrature components of these coefficients are being stored in the random access memory locations for carrier-type systems whereas only a single set of coefficients is required for baseband type systems.

The read only digital memory has a plurality of storage locations. Included in these locations is a set of digital instructions for approximating phase equalizing and amplitude equalizing the digital signal received by the digital processing unit. The digital instructions are further detailed to determine the value of the incoming transmitted digital signal, computing the difference between the combination of the phase and amplitude equalized signals, updating the leading transversal multiplying coefficients for delay distortion and the trailing decision feedback multiplying coefficients for amplitude distortion, and controlled updating of the trailing coefficients for delay distortion. The controlled updating of the trailing transversal multiplying coefficients for correction of delay distortion is dependent upon the transmission medium's differential delay characteristic and whether the system is of the baseband-type or carrier-type. When the delay characteristic is substantially even around the carrier frequency of the transmitted digital signal, the trailing multiplying coefficients for delay distortion are negatively symmetric on the in-phase component and positively symmetric on the quadrature phase component to the corresponding in-phase and quadrature phase components of the leading multiplying coefficients. Alternatively, where the delay characteristic is substantially odd around the carrier frequency of the transmitted digital signal, the trailing multiplying coefficients for delay distortion are positively symmetric on both the in-phase and quadrature components with respect to the in-phase and quadrature components of the leading multiplying coefficients.

The constrained adaptive equalizer of the present invention is also a component part of a modem which uses either a baseband-type modulation scheme (including single-sideband modulation) or a carrier-type system which uses a quadrature amplitude modulation scheme. In such a modem a transmitter is provided for sending digital signals representative of serial binary data. The transmitter utilizes a combination of phase and amplitude modulation of the carrier signal. Interface circuitry is also provided to the transmission medium for transmitting and receiving data signals. The modem includes a receiver for receiving a similarly modulated data signal. The receiver includes the constrained adaptive equalizer of the present invention for correcting amplitude and delay distortion in the data signal while minimizing noise amplification.

In a baseband system, or for a single sideband system which is baseband with added modulation and demodulation, the transmitter includes an encoder for encoding the data and representing it as an analog data signal, and a filter for shaping the analog data signal.

In a QAM carrier-type system the transmitter includes an encoder for encoding the data and separating the data into two discrete analog signals thereby transmitting a complex signal; filters for shaping each of the complex data signals; and modulators for modulating each of the data signals with two quadrature carrier signals.

The receiver in both baseband and carrier type sytems further includes a bandpass filter for limiting noise and providing shaping of the received signal; and an automatic gain control amplifier for providing constant signal levels to the receiver elements. In a carrier-type system the receiver includes a phase splitting network for separating the digital signal into in-phase and quadrature component data signals; a baud rate sampler for sampling the in-phase and quadrature data signals at time epochs determined by the received data signal; and a demodulator for demodulating the carrier signal from the in-phase and quadrature data signal. A carrier recovery network is also provided in the receiver for synchronizing the received data signal with the demodulating signal. In a full duplex system a heterodyner is provided for accepting data transmitted over both the highband and lowband channels.

A receiver for a single sideband system includes similar components to a QAM receiver but does not include a phase splitter. Similarly, in a baseband system the receiver would resemble a single sideband receiver without the demodulator.

BRIEF DESCRIPTION OF THE DRAWING

Further features of the present invention will become apparent from the following detailed description of the invention when taken in conjunction with the drawings, throughout which like characters indicate like parts in which:

FIG. 1 is a schematic representation of the differential delay characteristics of a full band and half band telephone system;

FIG. 4A is a block diagram illustrating adaptive control circuitry utilized in the constrained adaptive equalizer of the present invention;

FIG. 4B is a block diagram of constraining control circuitry for full band operation of a constrained adaptive equalizer in accordance with the present invention;

FIG. 4C is a block diagram of constraining control circuitry for use in half band operation for a constrained adaptive equalizer in accordance with the present invention;

FIG. 5 is a partial block, partial schematic illustration of a modem using quadrature amplitude modulation and having the constrained adaptive equalizer of the present invention in a microprocessor based embodiment in the receiver; and FIG. 6 is a block diagram representation of the random access memory used in the microprocessor based system of FIG. 5.

DETAILED DESCRIPTION

Figure 2:
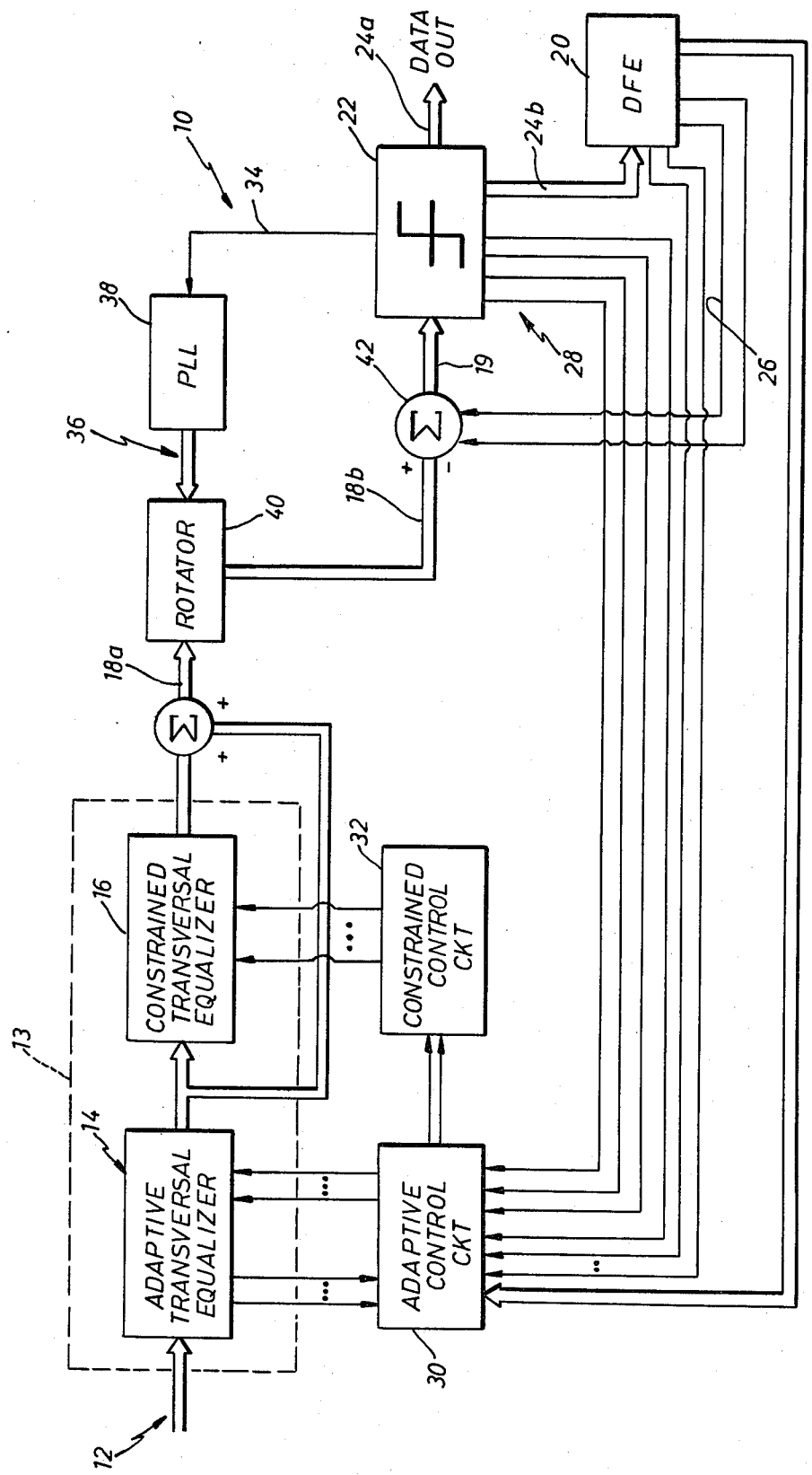
FIG. 2 is a block diagram of a constrained adaptive equalizer in accordance with the present invention including a carrier recovery network.

The adaptive equalizer of the present invention is a further development of the use of the combination of transversal and decision feedback equalization. The present development involves a constrained adaptive equalizer with constraints on the taps of the transversal section of the equalizer, which has both leading and lagging taps. These constraints force the transversal equalizer to correct only the leading echoes of a received digital signal in a communication system and treat them as if they resulted only from phase distortion. These constraints transform the transversal equalizer into an approximating phase equalizer and therefore minimize any additional noise amplification to the received signal. The decision feedback equalizer in the present invention continues to cancel the postcursors or trailing echoes without the addition to any noise. The constrained adaptive equalizer of the present invention utilizes the combination of transversal phse equalization with decision feedback equalization. This combination can be used for either passband or baseband equalization and for either complex signals, such as QAM signals, or real signals, such as baseband or single sideband signals. This description is of an embodiment for complex signals, however, the simplification of the circuitry to deal with real signals is well understood in the art.

The appropriate constraints on the transversal equalizer, which has in-phase and quadrature-taps is dependent upon the expected symmetry of the differential delay characteristic of the transmission medium around a carrier frequency. On a full channel telephone line, i.e. full band or half duplex systems, where the transmission medium has a differential delay characteristic which is substantially even around the carrier frequency, there is negative symmetry on the in-phase taps and positive symmetry on the quadrature taps. Alternatively, on a half channel telephone line, i.e. half band or full duplex, there is positive symmetry on both the in-phase and quadrature taps.

Referring now to the figures and specifically to FIG. 1 where a schematic illustration of an example of a differential delay characteristic of a typical telephone line is illustrated. The full band channel of a typical telephone line will normally encompass the frequencies of 600 to 3,000 Hz. The delay characteristic representation 1 in FIG. 1 in the full band channel is approximately parabolic and centered at a carrier frequency of 1,800 Hz. In the half band channel, on the other hand, the delay is approximately linear around the carrier frequencies for example 1,200 Hz and 2,400 Hz. An application of this observation lies in the combination transversal and decision feedback equalizer of the present invention. By treating all the leading echoes in a received signal as if they arose only from delay distortion the amount of noise amplification produced by these taps is minimized. Therefore, the constraints placed upon these taps is dependent upon the delay distortion characteristic of the transmission medium around the carrier frequency.

In a complex (passband) system the transversal equalizer has in-phase and quadrature multiplying coefficients C to achieve equalization. The transversal multiplying coefficients for a full band system have the relationship $C_{-n} = -C_n^*$, and for a half band system the multiplying coefficients have the relationships $C_{-n} = C_n$ where $n = -N, \ldots, -1$, and where $C_n$ is a complex number with real and imaginary parts corresponding to the in-phase and quadrature coefficients.

Referring now to FIG. 2 where a constrained adaptive equalizer 10 is illustrated in block diagrammatic form. The constrained adaptive equalizer 10 receives a complex data signal 12 having in-phase and quadrature components. The complex data signal 12 is received by a transversal equalizer 13 comprising an adaptive segment 14 and a constrained segment 16. The transversal equalizer 13 corrects the in-phase and quadrature components of the signal 12 for leading echoes by approximating phase equalization. The adaptive and constrained transversal equalization treats only the delay distortion characteristic of the in-phase and quadrature components of the complex data signal 12 thus delivering a phase equalized signal 18a.

The constrained adaptive equalizer 10 further includes a decision feedback equalizer 20 for simulating trailing echoes in the in-phase and quadrature components of the phase equalized signal 18a. The decision feedback equalizer 20 is electrically connected to decision making circuitry 22 including circuitry for determining the value of the received data signal and generating an output data signal 24 indicative of that value when compared to predetermined threshold limits. For example, in a 4×4 QAM communication system the data set is represented by ±1 and ±3. In such a system the decision circuitry 22 will monitor the equalized signal 19 and compare this signal to predetermined thresholds of −2, 0, and +2.

The result of the decision of circuitry 22 is a binary output signal 24a and a quantized analog signal which is output data signal 24b. The output data signal 24b is the decided signal delivered to the decision feedback equalizer 20 to be used in generating an amplitude equalized signal 26 for equalizing the trailing echoes in future complex data signals 12.

The decision circuitry 22 further generates error signals 28 representing the amplitude difference between the equalized signal 19 and the output data signal 24b. The error signal 28 is then transmitted to adaptive control circuitry 30 which is electrically connected to constrained control circuitry 32 both of which update the taps of the adaptive and constrained transversal equalizers 14 and 16, respectively. The adaptive control circuitry 30 also updates the trailing taps of the decision feedback equalizer 20.

Decision circuitry 22 generates an angular difference signal 34 which is a measure of the phase difference between a connected equalized signal 19 and the output data signal 24b which is then delivered to a phase locked loop carrier recovery circuit 36. The carrier recovery circuit 36 includes a phase lock loop 38 which locks onto an angular error and delivers to a rotator 40 the correction angle for both the in-phase and quadrature components of the phase equalized signal 18a. The rotator 40 receives the phase equalized signal 18a and delivers to a subtracting element 42 the corrected and rotated phase equalized signal 18b. The amplitude equalized signal 26 is also delivered to the substracting element 42 which is then subtracted from the phase equalized signal 18b, thus correcting for the trailing echoes in the signal 18b. The corrected equalized signal 19 is then delivered to the decision circuitry 22 for deciding the value of the transmitted signal based on the predetermined threshold limits as set out above.

Figure 3:
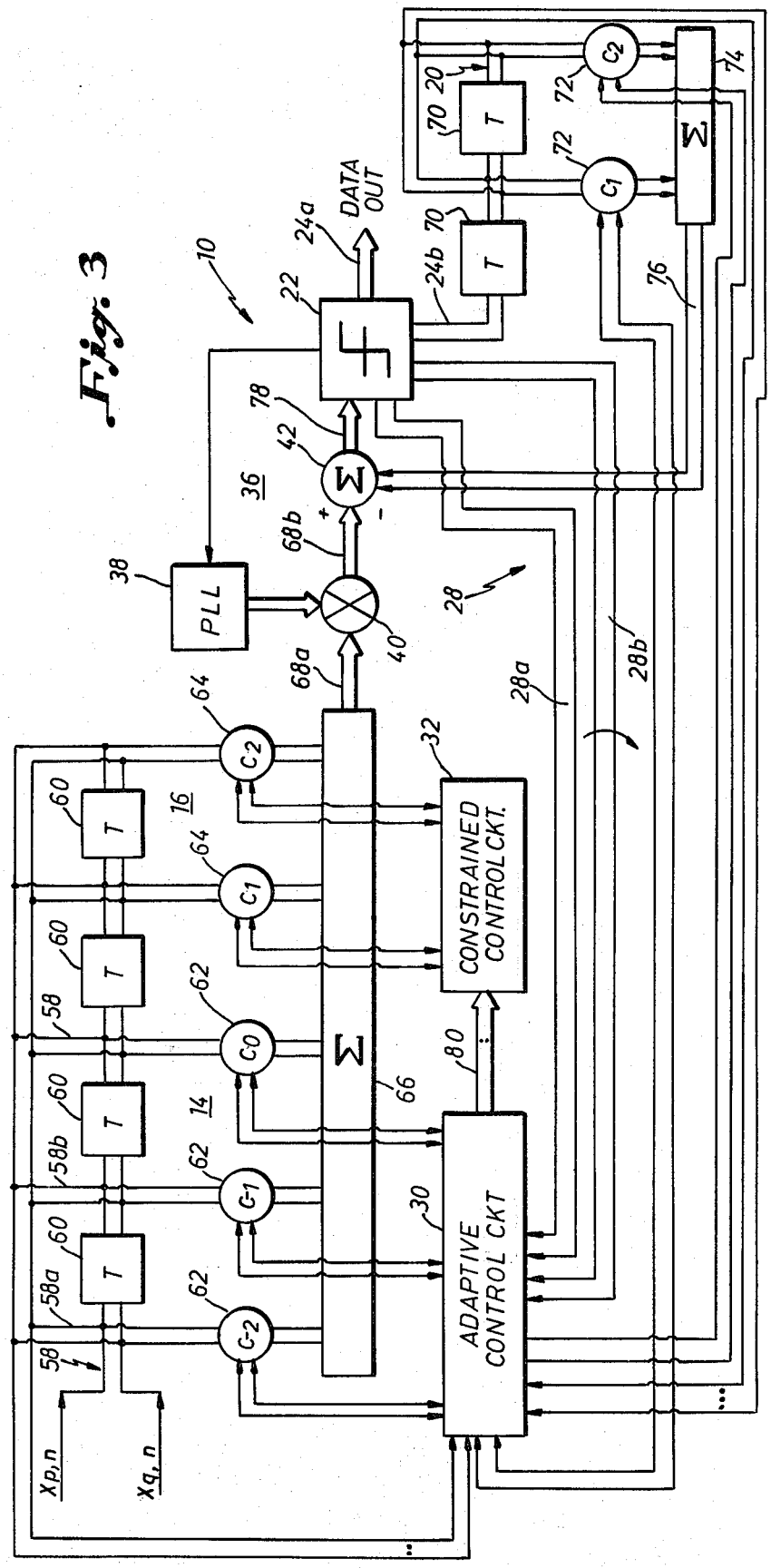
FIG. 3 is a partial block and partial schematic diagram of a constrained adaptive equalizer in accordance with the present invention including the phase splitting network, the sampler, and the demodulator.

FIG. 3 illustrates two major components of a receiver utilized in a quadrature amplitude modulation communication system. The first component is the combination of a phase splitter, band-rate sampler and demodulation circuit. The second component is the constrained adaptive equalizer 10 generally illustrated in FIG. 1.

The transmitted data signal 50 is an analog signal having a complex modulation carrier. The data signal 50 is received by the front end of the receiver which includes the phase splitting network 52. The data signal 50 is then separated by the network 52 into an in-phase component and a quadrature component. The signal 50 is sampled at a baud rate sampler 54 at time epochs determined by the characteristic of the received signal 50. The in-phase and quadrature components are then demodulated in the demodulating circuitry 56 and delivered to the constrained adaptive equalizer 10 as a complex data signal X, where X has in-phase and quadrature components represented by the relationship $$X = X_p + j^X q$$

The complex data signal X represented by the reference numeral 58 in FIG. 3 is delivered to the constrained transversal adaptive equalizer 13 including the adaptive transversal equalizer 14 and the constrained transversal equalizer 16. In one embodiment of the invention the adaptive equalizer and constrained equalizer 14 and 16, respectively, are electrically connected and comprise a delay line shift register having a plurality of delay elements 60. The adaptive transversal equalizer 14 further includes a plurality of storage elements in combination with a series of multiplier circuits 62 with the constrained transversal equalizer 16 also having a plurality of storage elements in combination with a series of multipliers 64. In the adaptive transversal equalizer 14, the storage elements contain leading multiplying coefficients while in the constrained transversal equalizer 16 the storage elements contain trailing multiplying coefficients.

The signal 58 is delivered to the series of delay elements 60 and intercepted between delay elements to be multiplied by the multiplying coefficients found in the respective storage elements 62 and 64. These products are then accumulated in an accumulator 66 and delivered to the carrier recovery circuit 36.

The object of the transversal equalizer component 13 of the constrained adaptive equalizer 10 is to phase equalize the in-phase and quadrature components of the complex data signal 58. The transversal equalizer 13 is designed to operate only on the phase distortion characteristics of the signal 58 thereby phase equalizing the signal 58. The leading multiplying coefficients 62 in the adaptive portion 14 of the transversal equalizer 13 and the trailing coefficients 64 in the constrained portion 16 of the transversal equalizer 13 are dependent upon the differential delay characteristic of the transmission medium around a selected carrier frequency. The coefficients for the equalizers are represented by Cn. Where Cn is a complex number having the relationship $Cn = C_{p,n} + jC_{q,n}$; where N in the example shown in FIG. 3 is equal to $-2 \ldots +2$.

In a communication system where the differential delay characteristic is symmetrical about the carrier the multiplying coefficients should have the relationship $C-n = -Cn^*$, to achieve phase equalization; and, in a communication system where the differential delay characteristic is antisymmetrical about the carrier the multiplying coefficients should have the relationship $C-n = Cn$ to achieve phase equalization.

A phase equalized signal 68a is delivered to the rotator 40 which is in electrical cooperation with the phase locked loop 38 and the decision circuitry 22. This signal 68a is correcting by rotation for phase difference. This rotated phase equalized signal 68b is then delivered to the subtracting element 42.

FIG. 3 further illustrates in more detail the decision feedback equalizer 20. The decision circuitry 22 delivers its decided value analog output data signal 24b to a shift register comprising a series of delay elements 70. In the decision feedback equalizer 20, the trailing taps are provided for simulating trailing echoes in the phase equalized rotated signal 68b. In a manner similar to the transversal equalizer storage elements 62 and 64 the combination of storage elements with multipliers 72 are provided. The storage elements 72 in the decision feedback equalizer 20 store trailing coefficients for simulating the trailing echoes in the phase equalized rotated signal 68b. The decided value signal 24b is delayed by elements 70 and multiplied by the trailing coefficients represented by $C_1$ and $C_2$ in the FIG. 3. These products are accumulated in an accumulator 74 to form a signal 76 which is delivered to the subtracting element 42. Thus, an amplitude and delay distortion corrected, i.e., equalized, signal 78 is delivered to the decision circuitry 22 for determining the decided value of the received signal 58 based upon predetermined threshold limits which differ as a function of the type of modulation system utilized as described above.

In an ongoing system the decision circuitry 22 will deliver error signals 28a which comprise an in-phase and quadrature component based on the difference between the equalized signal and the output data signal 24b; and rotated in-phase and quadrature error signal 28b based on the difference between the equalized signal and output data signal value 24b. These error signals are delivered to adaptive control circuitry 30 for updating the multiplying coefficients Cn. The double error signal is necessary since both the leading multiplying coefficients in the transversal filter, i.e. in FIG. 3 $C_{-2}$ and $C_{-1}$ and the trailing multiplying coefficients, i.e. $C_1$ and $C_2$ in the decision feedback equalizer 20 are updated. The decision feedback coefficients 20 operate in an environment of a rotated signal 24b whereas the multiplying coefficients in the adaptive transversal equalizer 14 operate on a non-rotated signal 58a.

The adaptive control circuitry 30 provides a means for adaptively updating the leading multiplying coefficients 62 of the adapted transversal equalizer 13 and the trailing multiplying coefficients 72 of the decision feedback equalizer 20.

Adaptive updating of the leading multiplying coefficients of the transversal equalizer 13 is accomplished by cross-correlating the present error signal 28a with past and present values of the received data signal 58. The adaptive updating of the trailing coefficients of the decision feedback equalizer 20 is accomplished by cross-correlating the error signal 28b with the output data signal 24b.

FIG. 4A illustrates the adaptive control circuitry utilized in one embodiment of the present invention. The adaptive control circuitry 30 comprises a series complex multipliers and adders 78. Each element 78 receives the complex error signal 28a which may be represented by e where $e = e_p + je_q$. Each element 78 further receives the existing value of one of the multiplying coefficients Cn and the in-phase and quadrature components of each successive complex data signal 58a–c. As a further part of the adaptive updating a convergence constant mu is also included to calculate the updated multiplying coefficients. Thus, the new multiplying coefficients Cn (new) is equal to $\Delta Cn + Cn$ (old) where, $$\Delta Cn = mu\ e^* \ Xn$$

The adaptive control circuitry 30 updates the leading coefficients of the adaptive equalizer 14 and the trailing coefficients of the decision feedback equalizer 20 and transmits the new leading coefficients to the constrained control circuitry 32. The in-phase and quadrature components of the leading multiplying coefficients of the adaptive transversal equalizer 14, signals 80 are delivered to the constrained control circuit 32 where the signal 80 represents Cn (new) and n equals $-2$ and $-1$. FIGS. 4B and 4C illustrate constraining control circuitry in the cases where the differential delay characteristic is deemed to by symmetrical and antisymmetrical, respectively.

In FIG. 4B the new in-phase and quadrature multiplying coefficients are delivered to separate multiplier circuits 82 and 84 respectively. This results in the relationship $C-n = -Cn^*$ which translates into the relationships $C_{p,-n} = -C_{p,n}$ where $n = -N, \ldots, 1$ or $C_{p,1}$ is equal to $-C_{p,-1}$ and $C_{q,1}$ is equal to $C_{q,-1}$.

As shown in FIG. 4C the leading multiplying coefficients 62 of the adaptive equalizer 14 are equal to the trailing coefficients 64 of the constraining portion of the transversal equalizer 16. Thus, $C_{p,-2}$ is equal to $C_{p,2}$ for example. This is accomplished using a single plus one multiplier 86 in the embodiment described in FIG. 3.

Adaptive and constrained updating of the multiplying coefficients Cn in the adaptive and constrained equalizers 14 and 16 result in approximate phase equalization of the received complex data signal 58. By treating all the leading echoes in the receive complex data signal 58 as if they arose from only phase distortion, and not amplitude distortion, the noise amplification of the system is minimized. However, if this assumption is wrong, that is, the leading echoes are generated by both delay and amplitude distortion then the multiplying coefficients of the decision feedback equalizer will be adjusted to a different value to compensate for this amplitude distortion. However, the decision feedback equalizer 20 operates on sliced data signals and not noise enhanced signals and therefore does not add extra noise to the system with this correction.

FIGS. 5 and 6 illustrate a microprocessor based embodiment of the constrained adaptive equalizer of the present invention. This embodiment is illustrated in FIG. 5 as being incorporated into a modem environment used in a typical telephone communication network. A transmitter 90 for a modem A is illustrated and a receiver 92 for a modem B is illustrated, assuming the data to be transmitted is transmitted through line interface circuitry 94 from the transmitter of modem A to the receiver 92 of modem B.

In a quadrature amplitude modulation system, serial binary data 96 is transmitted to an encoder 98 for generating analog signals $a_n$ and $b_n$. These signals are generated based upon the type of quadrature amplitude modulation system used, for example 4-phase, 16-point or 8 phase data set systems. After the analog signals $a_n$ and $b_n$ are generated they are transmitted to filters 100 and 102 respectively for shaping of those signals. These signals are then delivered to a modulation device 104 where the signals are modulated by a complex modulation carrier signal then added together in adder 106 and transmitted through a transmission medium through line interface circuitry 94 to the receiver 92 of modem B.

The modulated data signal 108 is transmitted to a heterodyner 110 which is required to receive the signal both in the high band and low band channels of a full duplex network; or is directly transmitted to a band pass filter 112 for limiting noise and providing shaping of the received modulated signal 108. The signal is then transmitted to an automatic gain control amplifier 114 for providing constant signal levels to the remainder of the receiver 92.

The complex data signal is then delivered to a phase splitter network 116, which may be the phase splitter network 52 illustrated in FIG. 3, producing a complex signal having in-phase and quadrature components. These in-phase and quadrature components are then delivered to sample and hold circuitry which sample the data at time epochs determined by the received signal.

In the present invention although the sample and hold circuitry 118 will generate nulls in the sampled spectrum, and these nulls are manifested as increased amplitude distortion, this distortion is corrected by the decision feedback equalizer and not the transversal equalizer, thus, there is no added noise penalty.

The sampled signal is then transmitted to an analog to digital converter 120 to provide digital in-phase and quadrature signals to a 16-bit microprocessor 122.

The microprocessor 122 is the basic element in a further embodiment of the constrained adaptive equalizer of the present invention. In a 2400 bit per second modem for example a Fairchild Model 9445 16-bit mocroprocessor is preferred. This digital processor 122 is programmed for equalizing the digital signal received from the analog to digital converter 120 which has been transmitted through a medium having amplitude and delay distortion characteristics. The digital processor phase and amplitude equalizes the signal to correct for leading and trailing echoes in the received signal 108.

The constrained adaptive equalizer using the digital processor 122 for phase and amplitude equalization of the received signal includes digital memories for implementing digital delay lines and storage for the multiplying coefficients used for amplitude and delay distortion correction.

These digital memories include a read-only memory 124 and a random access memory (RAM) 126. FIG. 6 further illustrates the use of the random access memory 126. In the random access memory 126 a plurality of storage locations are found with a predefined number of these locations implementing a first digital delay line 128. In this first digital delay line the storage locations receive from the digital processor 122 the in-phase and quadrature components of received signals $X_p,n$ and $X_q,n$ where $n=-2\ldots,+2$ in the example shown. A corresponding number of locations in the RAM 126 are utilized for storing the leading and trailing multiplying coefficients of the transversal segment of the constrained adaptive equalizer of the present invention. These locations 130 include the in-phase and quadrature components of the multiplying coefficients associated with the stages of the delay line 128, i.e., $C_{p,n}$ and $C_{q,n}$ where n equals $-2\ldots,+2$.

The random access memory 126 also includes the implementation of a second digital delay line 132 for simulating the trailing echoes in the received signal 108. The values of the signals generated by the digital processor in conjunction with the instruction set of the read-only memory are stored in locations 132 and signified by $\hat{a}_n$ and $\hat{b}_n$. The corresponding multiplying coefficients for this delay line 132 represented in locations 134 are indicated by $d_p,n$ and $d_q,n$ for the in-phase and quadrature components of these multiplying coefficients.

Operationally, the digital processor reads an instruction set stored in a plurality of storage locations in the read-only memory and operates upon this instruction set to transmit to the random access memory storage locations 128, the in-phase and quadrature phase components of the received digital signal and the decided value of the received signal. The in-phase and quadrature phase components of this decided value signal are stored in locations 132 with the corresponding multiplying coefficients $d_{p,n}$ and $d_{q,n}$ stored in locations 134.

The digital processor 122 will shift the signals $X_n$ and $a_{\hat{n}}$ and $b_{\hat{n}}$ through the locations 128 and 132 respectively while operating upon these signals with the respective multiplying coefficients found in storage locations 130 and 134 to phase equalize the received signal 108. The coefficients Cn and dn are updated by the digital processor 122. The leading coefficients for example C$-$2 and C$-$1 and d$+$1 and d$+$2 are adaptively updated utilizing the error calculated by the processor 122 based upon the difference in the phase equalized signal and the decided value signal; the received and decided value signals themselves; as well as a convergence constant. The trailing coefficients of the transversal equalizer i.e. C$_1$ and C$_2$ are control updated depending upon the differential delay characteristics of the medium around a selected carrier frequency. This updating of the multiplying coefficients results in change in value of the contents of the locations 130 and 134.

The constrained adaptive equalization of the digital signal received from the analog to digital converter 120 results in a decided value output data signal 136 corrected for leading and trailing echoes resulting from both amplitude and phase distortion in the transmission medium. The signal 136 is finally delivered to a decoder 138 and a descrambler 140 to obtain serial binary data-out 142 equal to the serial binary data in 96 at modem A.

While the present invention has been described and illustrated with respect to a specific embodiment it will be understood to those skilled in the art that many changes and modifications may be made without departing from the spirit and scope of the invention. For example, the constrained adaptive equalizer of the present invention may be embodied in a special purpose digital signal processor or an 8-bit microprocessor driving a stand alone multiplier, both having appropriate digital memories for implementing the digital delay lines and storing the necessary multiplying coefficients for phase and amplitude equalization. Further, the adaptive updating of the multiplying coefficients may be accomplished by cross-correlating the present error signal with the past, present and future values of the output data signal.

What is claimed is:

1. A constrained adaptive equalizer for digital communication systems comprising:
   a constrained transversal adaptive equalizer having leading and trailing multiplying coefficients for correcting leading echoes in a received digital signal by approximating phase equalization thereby generating a phase equalized signal;
   a decision feedback equalizer having trailing multiplying coefficients for simulating trailing echoes in said phase equalized signal;
   means for generating an equalized signal representing the difference between the phase equalized signal and said simulated trailing echoes;
   decision means adapted to receive said equalized signal for determining the value of said received digital signal and generating an output data signal indicative of that value, including means for generating an error signal representing the difference between the equalized signal and the output data signal, and means for correcting the phase difference between the equalized signal and the output data signal;
   first means for adaptively updating said leading multiplying coefficients of said constrained transversal adaptive equalizer;
   second means for adaptively updating said trailing multiplying coefficients of said decision feedback equalizer by cross-correlating said error signal with the output data signal; and,
   means for adaptively controlling the trailing coefficients of said constrained transversal adaptive equalizer electrically connected to said first means, wherein the magnitude of the trailing coefficients are equal to the corresponding leading coefficients.

2. The constrained adaptive equalizer as set forth in claim 1 wherein said digital communication system is a quadrature amplitude modulation system having a differential delay characteristic symmetrical about a carrier frequency said trailing and leading multiplying coefficients of said constrained transversal adaptive equalizer having in-phase and quadrature components, and said means for adaptively controlling said trailing multiplying coefficients updating the in-phase trailing multiplying coefficients to be equal to a negative of the corresponding in-phase leading coefficients, and updating the quadrature component of the trailing multiplying coefficients to be equal to the quadrature component of the corresponding leading multiplying coefficients.

3. The constrained adaptive equalizer as set forth in claim 1 wherein said digital communication system is a quadrature amplitude modulation system having a differential delay characteristic that is antisymmetric about a carrier frequency, said constrained transversal adaptive equalizer having leading and trailing coefficients with in-phase and quadrature components, wherein said means for adaptively controlling said trailing multiplying coefficients of said constrained transversal adaptive equalizer update the in-phase and quadrature components of the trailing coefficients to be equal to the corresponding in-phase and quadrature components of said leading multiplying coefficients.

4. The constrained adaptive equalizer as set forth in claim 1 wherein said digital communication system is a baseband system having a differential delay characteristic that is antisymmetric about a zero frequency, said means for adaptively controlling said trailing multiplying coefficients of said constrained transversal adaptive equalizer updating the trailing multiplying coefficients of said constrained transversal adaptive equalizer to be equal to a negative of the corresponding leading multiplying coefficients.

5. The constrained adaptive equalizer as set forth in claim 1 wherein said means for adaptively updating said leading multiplying coefficients of said constrained transversal adaptive equalizer comprise a series of multiplier-adder combinations for cross-correlating said error signal with past and present received data signals associated with each of said leading multiplying coefficients, thereby generating adaptively updated leading multiplying coefficients.

6. The constrained adaptive equalizer as set forth in claim 1 wherein said means for adaptively updating said leading multiplying coefficients of said constrained transversal adaptive equalizer comprises a series of multiplier-adder combinations for cross-correlating said present error signal with past, and present values of said output data signal.

7. The constrained adaptive equalizer as set forth in claim 1 wherein said constrained transversal adaptive equalizer comprises a delay line shift register having a plurality of stages wherein each stage can accommodate a digital word having a known length; a series of storage elements containing said leading and trailing multiplying coefficients of said constrained transversal adaptive equalizer, each of said storage elements electrically connected to a different stage of said shift register, a series of multipliers electrically connected to each of said storage elements and said stages for multiplying the contents of each of said storage elements with the contents of the corresponding stages of said shift register, and a summer for accumulating the products of the multiplication of the contents of the storage elements with the contents of the corresponding stages of the shift register.

8. The constrained adaptive equalizer as set forth in claim 7 wherein each of said storage elements is capable of storing up to 16 bits of binary data.

9. The constrained adaptive equalizer as set forth in claim 7 wherein each stage of said shift register is capable of storing up to 16 bits of binary data.

10. The constrained adaptive equalizer as set forth in claim 1 wherein said decision feedback equalizer comprises:

a delay shift register having a plurality of stages, each of said stages accommodating a digital word having a known length;

a plurality of storage elements containing said trailing multiplying coefficients of said decisional feedback equalizer, each of said storage elements electrically connected to a different stage of said shift register;

a series of multipliers electrically associated with each of said storage elements and said stages of said shift register for multiplying the contents of each of said storage elements with the contents of the corresponding stages of said shift register; and, a summer for accumulating the signal products of the multiplication of the contents of the storage elements with the contents of the corresponding stages of the shift register.

11. The constrained adaptive equalizer as set forth in claim 1 in a digital communication system of the quadrature amplitude modulation type, wherein said decision means further includes a means for determining the in-phase and quadrature components of said error signal.

12. The constrained adaptive equalizer as set forth in claim 1, said digital communication system is of the quadrature amplitude modulation type and wherein said means for correcting phase difference comprises:

means for rotating the received digital signal for compensation of any phase difference with said corresponding transmitted digital signal;

means for determining the angular error between the output data signal and said equalized signal; and, a phase locked loop electrically connected to said means for determining angular error and means for rotating, for determining the amount of rotation required to compensate for said phase difference.

13. The constrained adaptive equalizer as set forth in claim 1 wherein said constrained transversal adaptive equalizer comprises:

a first delay line shift register having a plurality of stages wherein each stage can accommodate a digital word having a known length, a plurality of first storage elements containing said leading and trailing multiplying coefficients of said constrained transversal adaptive equalizer, each of said first storage elements electrically connected to a different stage of said first shift register, a plurality of first multipliers electrically connected to each of said first storage elements and stages of said first register for multiplying the contents of each of said first storage elements with the contents of the corresponding stages of said first shift register, and a first summer for accumulating the signal products of the multiplication of the contents of the first storage elements with the contents of the corresponding stages of said first shift register; and, said decision feedback equalizer comprises:

a second delay shift register having a plurality of stages, each of said stages accommodating a digital word having a known length;

a plurality of second storage elements containing said trailing multiplying coefficients of said decision feedback equalizer, each of said second storage elements electrically connected to a different stage of said second shift register, a series of second multipliers electrically associated with each of said second storage elements and said stages of said second shift register for multiplying the contents of each of said second storage elements with the contents of the corresponding stages of said second shift register, and a second summer for accumulating the signal products of the multiplication of the contents of the second storage elements with the contents of the corresponding stages of the second shift register.

14. The constrained adaptive equalizer as set forth in claim 5 for a digital communication system of the quadrature amplitude modulation type wherein said means for adaptively updating said leading multiplying coefficients of said constrained transversal adaptive equalizer by cross-correlating said error signal with past and present received data signals associated with each of said leading multiplying coefficients comprises a complex multiplier electrically connected to an adder, said complex multiplier receiving the in-phase and quadrature components of said error signal and cross-correlating these signals with the corresponding in-phase and quadrature components of said received signals, a convergence constant which multiplies said cross-correlation, which product is subtracted from the corresponding in-phase and quadrature components of said leading multiplying coefficients.

15. The constrained adaptive equalizer as set forth in claim 6 for a digital communication system of the quadrature amplitude modulation type wherein said means for adaptively updating said leading multiplying coefficients of said constrained transversal adaptive equalizer by cross-correlating said present error signal with past, present and future values of said output data signals comprises a complex multiplier electrically connected to an adder, said complex multiplier receiving the in-phase and quadrature components of said error signal and cross-correlating these signals with the corresponding in-phase and quadrature components of said output data signals, a convergence constant which multiplies said cross-correlation which product is subtracted from the corresponding in-phase and quadrature components of said leading multiplying coefficients.

16. The constrained adaptive equalizer as set forth in claim 5 for a digital communication system of the quadrature amplitude modulation type wherein said means for adaptively updating said trailing multiplying coefficients of said decision feedback equalizer by cross-correlating said present error signal with past values of said output data signal comprises a complex multiplier electrically connected to an adder, said complex multiplier receiving the in-phase and quadrature components of said error signal and cross-correlating these signals with the corresponding in-phase and quadrature components of said output data signals, a convergence constant which multiplies said cross-correlation, which product is added to the corresponding in-phase and quadrature components of said leading multiplying coefficients.

17. The constrained adaptive equalizer as set forth in claim 2 when used in a communication system of the quadrature amplitude modulation type in which the differential delay distortion of the transmission medium is substantially symmetric around a selected carrier frequency wherein said means for adaptively controlling said trailing multiplying coefficients of said constrained transversal adaptive equalizer comprises a minus one multiplier for multiplying the in-phase component of the corresponding adaptively updated leading multiplying coefficients, and a plus one multiplier for multiplying the quadrature component of the corresponding adaptively updated leading multiplying coefficients.

18. The constrained adaptive equalizer as set forth in claim 3 when used in a communication system of the quadrature amplitude modulation type in which the differential delay distortion of the transmission medium is substantially antisymmetric around a selected carrier frequency wherein said means for adaptively controlling said trailing multiplying coefficients of said constrained transversal adaptive equalizer comprises a plus one multiplier for multiplying both the in-phase and quadrature components of the corresponding adaptively updated leading multiplying coefficients.

19. The constrained adapted equalizer as set forth in claim 4 wherein said means for adaptively controlling said trailing multiplying coefficients of said constrained transversal adaptive equalizer comprises a minus one multiplier for multiplying the corresponding adaptively updated leading multiplying coefficients.

20. The constrained adaptive equalizer as set forth in claim 1 wherein said constrained transversal adaptive equalizer, said decision feedback equalizer, said decision means, said means for adaptively updating the leading multiplying coefficients of said constrained adaptive transversal equalizer and the trailing coefficients of said decision feedback equalizer, and means for adaptively controlling said trailing multiplying coefficients of said constrained transversal adaptive equalizer, comprise a programmed microprocessor electrically connected to a plurality of digital memories, wherein said digital memories include a read-only memory for storing instructions for approximating phase equalization of the received signal for correcting said leading echoes and thereby generating a phase equalized signal, and for correcting said trailing echoes in said phase equalized signal, and a random access memory having a plurality of storage locations with a predefined number of said locations implementing a digital delay line, and a corresponding number of said locations storing leading and trailing multiplying coefficients for correcting delay distortion in said received signal, and trailing coefficients for correcting amplitude distortion of said phase equalized signal.

21. A constrained adaptive equalizer for quadrature amplitude modulation carrier type digital communication systems comprising:
   a constrained transversal adaptive equalizer having a means for correcting leading echoes by approximating phase equalization of a received digital signal thereby generating a phase equalized signal;
   a decision feedback equalizer having trailing multiplying coefficients for simulating trailing echoes in said phase equalized signal;
   means for generating an equalized signal representing the difference between the phase equalized signal and said simulated trailing echoes; and
   decision means adapted to receive said equalized signal for determining the value of said received digital signal and generating an output data signal indicative of that value.

22. The constrained adaptive equalizer as set forth in claim 21 wherein said constrained transversal adaptive equalizer having leading and trailing multiplying coefficients for correcting leading echoes in a received digital signal by approximating phase equalization, thereby generating a phase equalized signal, and said means for correcting leading echoes by approximating phase equalization comprises:
   first means for adaptively updating said leading multiplying coefficients of said constrained transversal adaptive equalizer;
   second means for adaptively updating said trailing multiplying coefficients of said decision feedback equalizer; and,
   means for adaptively controlling the trailing multiplying coefficients of said constrained transversal adaptive equalizer, electrically connected to said first means, wherein the magnitude of the trailing multiplying coefficients are equal to the corresponding leading multiplying coefficients.

23. A constrained adaptive equalizer for quadrature amplitude modulation digital communication system comprising:
   means for correcting leading echoes in a received digital signal by approximating phase equalization, thereby generating a phase equalized signal;
   means for simulating trailing echoes in said phase equalized signal;
   means for generating an equalized signal representing the difference between the phase equalized signal in said simulated trailing echoes; and,
   means for determining the value of said received signal by comparison of said equalized signal with a predetermined threshold value, said means for determining generating an output data signal indicative of the value of said received digital signal.

24. A constrained adaptive equalizer for quadrature amplitude modulation digital communication systems comprising:
   a constrained transversal adaptive equalizer having leading and trailing multiplying coefficients for correcting leading echoes in a received digital signal by approximating phase equalization thereby generating a phase equalized signal, said constrained transversal adaptive equalizer comprising:
   a first delay line shift register having a plurality of stages wherein each stage can accommodate a digital word having a known length,
   a plurality of first storage elements containing said leading and trailing multiplying coefficients of said constrained transversal adaptive equalizer, each of said first storage elements electrically connected to a different stage of said first shift register, a plurality of first multipliers electrically connected to each of said first storage elements of said stages, for multiplying the contents of each of said first storage elements with the contents of the corresponding stages of said first shift register, and a first summer for accumulating the products of the multiplication of the contents of the first storage elements with the contents of the corresponding stages of the first shift register;
   a decision feedback equalizer having trailing multiplying coefficients for simulating trailing echoes in said phase equalized signal comprising:
   a second delay shift register having a plurality of stages, each of said stages accommodating a digital word having a known length;
   a plurality of second storage elements containing said trailing multiplying coefficients of said decision feedback equalizer, each of said second storage elements electrically connected to a different stage of said second shift register;
   a series of second multipliers electrically associated with each of said second storage elements and said stages of said second shift register for multiplying the contents of each of said second storage elements with the contents of the corresponding stages of said second shift register, and a second summer for accumulating the signal products of the multiplication of the contents of the second storage elements with the contents of the corresponding stages of the second shift register;

means for generating an equalized signal representing the difference between the phase equalized signal and said simulated trailing echoes;

decision means adapted to receive said equalized signal for determining the value of said received digital signal and generating an output data signal indicative of that value, including means for generating an error signal representing the difference between the equalized signal and the output data signal, and means for correcting the phase difference between the equalized signal and the output data signal, said means for correcting including:

means for rotating the received digital signal for compensation of any phase difference with said output data signal, means for determining the angular error between the output data signal and said corresponding transmitted signal, and, a phase locked loop electrically connected to said means for rotating, for determining the amount of rotation required to compensate for said phase difference;

means for adaptively updating said leading multiplying coefficients of said constrained transversal adaptive equalizer;

means for adaptively updating said trailing multiplying coefficients of said decision feedback equalizer by cross-correlating said error signal with the output data signal; and, means for adaptively controlling the trailing coefficients of said constrained transversal adaptive equalizer, wherein the magnitude of the trailing coefficients are equal to the corresponding leading coefficients.

25. A quadrature amplitude modulation digital communication system comprising:

a transmitter for sending digital signals representative of serial binary data, said transmitter utilizing a combination of amplitude and phase modulation;

interface circuitry to the transmission medium of the communication system for transmitting and receiving digital signals; and, a receiver for receiving modulated digital signals including a constrained adaptive equalizer having a constrained transversal equalizer with decision feedback for correcting said digital signals for amplitude and delay distortion while minimizing noise amplification.

26. The quadrature amplitude modulation digital communication system as set forth in claim 25 wherein said transmitter further comprises:

an encoder for separating said serial data into two discrete analog data signals, filters electrically connected to said encoders for shaping said data signals; and, modulators for modulating said data signals with a quadrature carrier signals.

27. The quadrature amplitude modulation digital communication system as set forth in claim 25 wherein said receiver further includes:

a bandpass filter for limiting noise and providing shaping of the received modulated digital signals;

a phase splitting network for separating said digital signals into in-phase and quadrature signals;

a baud rate sampler for sampling said in-phase and quadrature signals at epochs determined by the received digital signals; and a demodulator for demodulating the carrier signal from said in-phase and quadrature digital signals.

28. The quadrature amplitude modulation digital communication system as set forth in claim 25 wherein said constrained adaptive equalizer comprises:

a constrained transversal adaptive equalizer having leading and trailing multiplying coefficients for correcting leading echoes in a received digital signal by approximating phase equalization, thereby generating a phase equalized signal;

a decision feedback equalizer having trailing multiplying coefficients for simulating trailing echoes in said phase equalized signal;

means for generating an equalized signal representing the difference between the phase equalized signal and said simulated trailing echoes;

decision means adapted to receive said equalized signal for determining the value of said received digital signal and generating and output data signal indicative of that value, including means for generating an error signal representing the difference between the equalized signal and the output data signal, and means for correcting the phase difference between the equalized signal and the output data signal;

means for adaptively updating said leading multiplying coefficients of said constrained transversal adaptive equalizer;

means for adaptively updating said trailing multiplying coefficients of said decision feedback equalizer by cross-correlating said error signal with the output data signal; and, means for adaptively controlling the trailing coefficients of said constrained transversal adaptive equalizer, wherein the magnitude of the trailing coefficients are equal to the corresponding leading coefficients.

29. The quadrature amplitude modulation digital communication system as set forth in claim 25 further including a carrier recovery network for synchronizing the equalized digital signal with said demodulating signal.

30. The quadrature amplitude modulation digital communication system as set forth in claim 27 further including a heterodyner for receiving said digital signal in both the high and low band areas of a full duplex system.

31. The quadrature amplitude modulated digital communication system as set forth in claim 27 further including a decoder for transforming said digital signals into serial binary data.

32. A quadrature amplitude modulated digital communication system comprising:

a transmitter for sending digital signals representative of serial binary data, said transmitter using a combination amplitude and phase modulation of a carrier, said transmitter further including an encoder for separating said serial data into two discrete analog data signals, filters electrically connected to said encoder for shaping said data signals, and modulators for modulating each of said data signals with quadrature signals;

interface circuitry to the transmission medium for transmitting and receiving said digital signals;

a receiver for receiving similarly modulated data signals including a bandpass filter for limiting noise and providing shaping of said received modulated signals, an automatic gain control amplifier for providing constant signal levels to said received modulated signals;

a phase splitting network for separating the modulated data signals into in-phase and quadrature signals, a band rate sampler for sampling said in-phase and quadrature data signals at time epochs determined by the received modulated data signals, and a demodulator for demodulating the carrier signal from said in-phase and quadrature data signals;

a constrained adaptive equalizer for correcting said data signals for amplitude and delay distortion while minimizing noise amplification; and, a carrier recovery network for synchronizing the equalized data signal with said demodulating signal.

33. A constrained adaptive equalizer for quadrature amplitude modulation digital communication systems comprising:

a programmed digital processor for equalizing a digital signal transmitted over a medium having amplitude and delay distortion characteristics, said digital processor adapted to receive said transmitted digital signal;

a digital random access memory electrically connected to said processor having a plurality of storage locations with a predefined number of said locations implementing a first digital delay line, and a corresponding number of said locations storing leading and trailing multiplying coefficients for correcting delay distortion, said random access memory also having a predefined number of locations for implementing a second digital delay line with a corresponding number of locations storing trailing coefficients for correcting amplitude distortion; and a digital read only memory electrically connected to said processor having a plurality of storage locations for storing a set of instructions for approximating phase equalization of said received digital signal, amplitude equalizing said received digital signal, determining the value of said received digital signal and computing phase and amplitude errors between equalized signals and received signal values, updating said leading multiplying coefficients, and adaptively controlling the trailing multiplying coefficients to compensate for delay distortion such that the magnitude of the trailing multiplying coefficients are equal to the corresponding leading multiplying coefficients.

* * * * *